Sept. 28, 1954     H. G. M. DE FRANCE ET AL     2,690,471
COLOR TELEVISION SYSTEM
Filed April 15, 1952                                                9 Sheets-Sheet 1
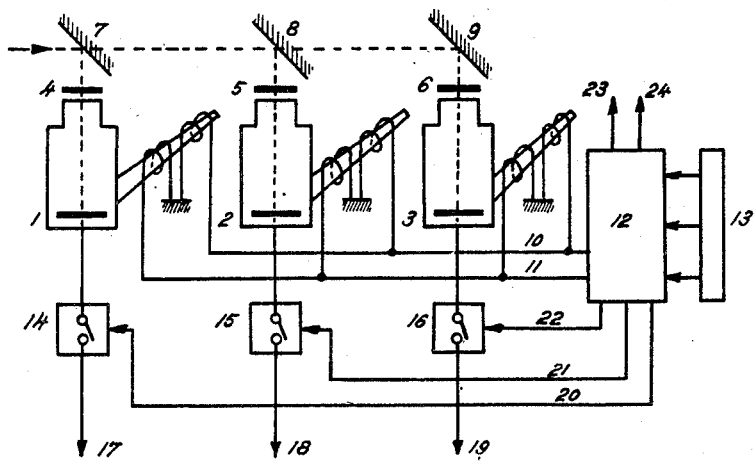
Fig: 1
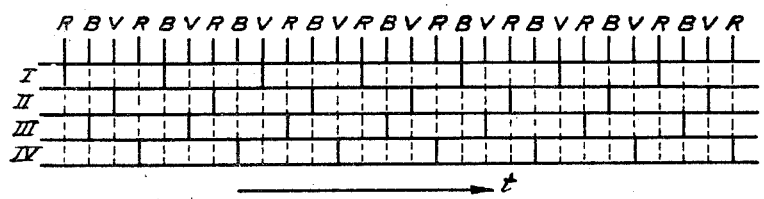
Fig: 2
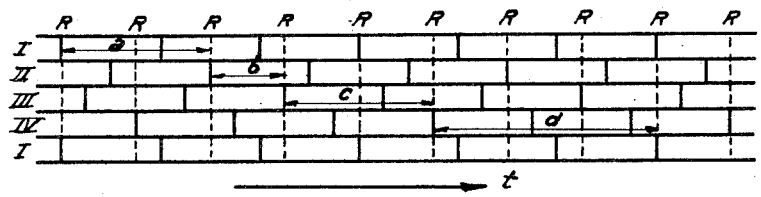
Fig: 3
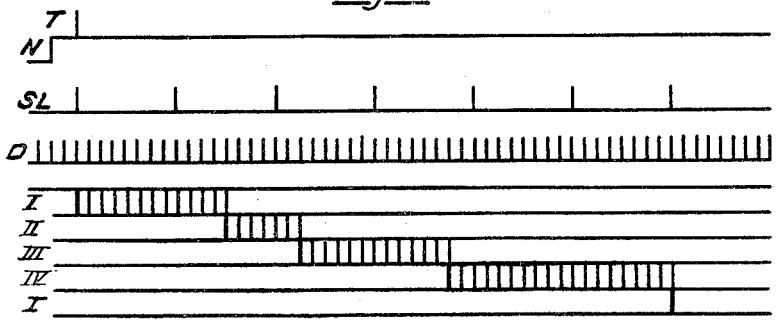
Fig: 4
INVENTORS
Henri G. M. De France
André L. A. Feyzeau
By Ralph B. Stewart
Attorney

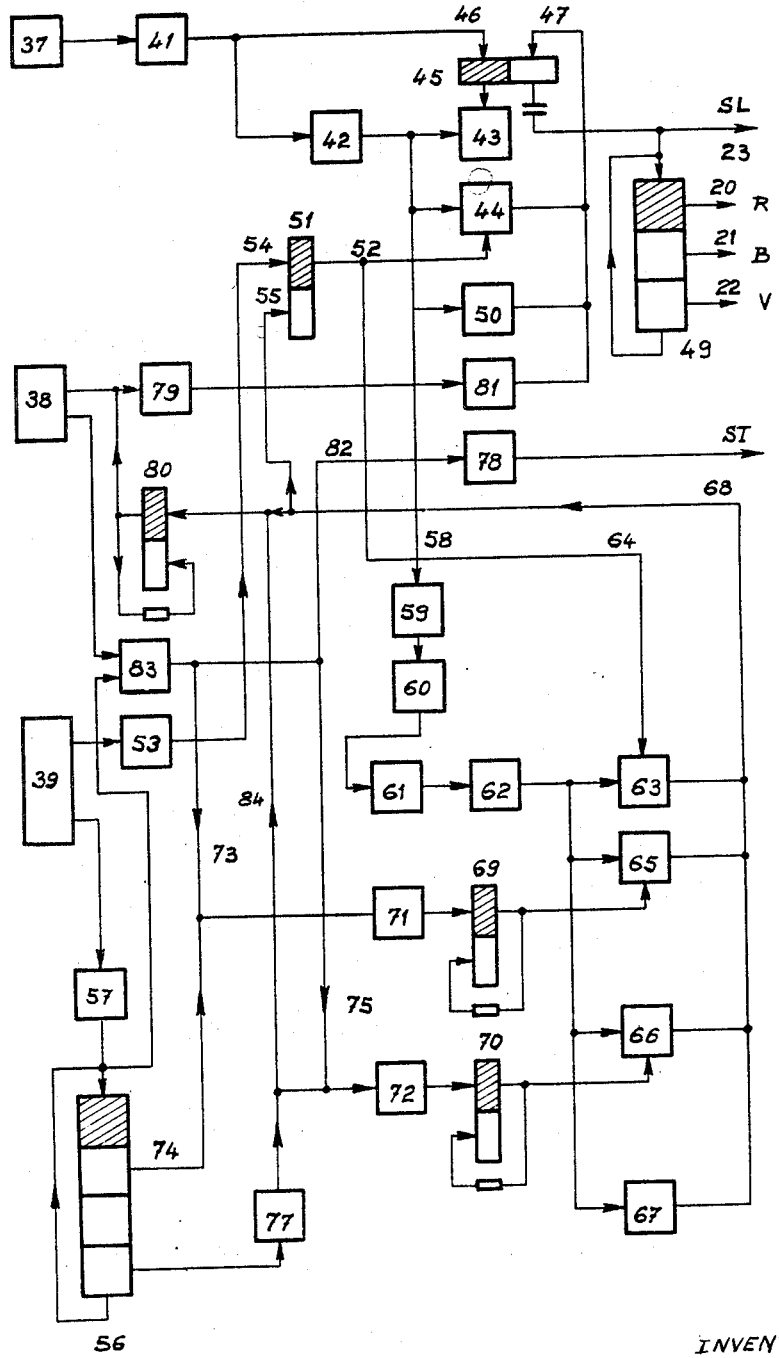
Fig: 6

Sept. 28, 1954  H. G. M. DE FRANCE ET AL  2,690,471
COLOR TELEVISION SYSTEM
Filed April 15, 1952  9 Sheets-Sheet 4
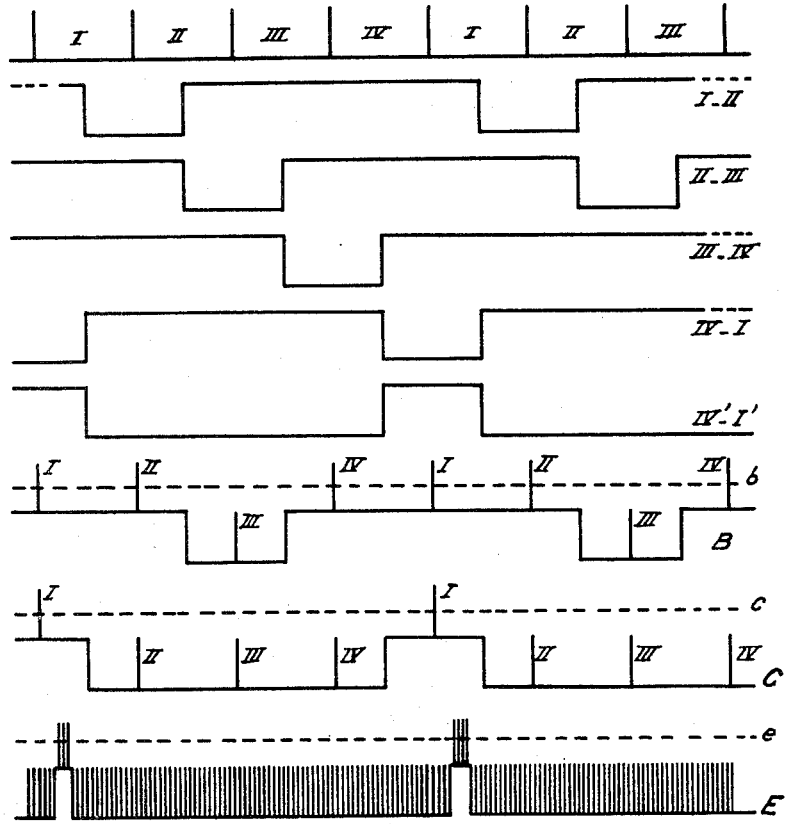
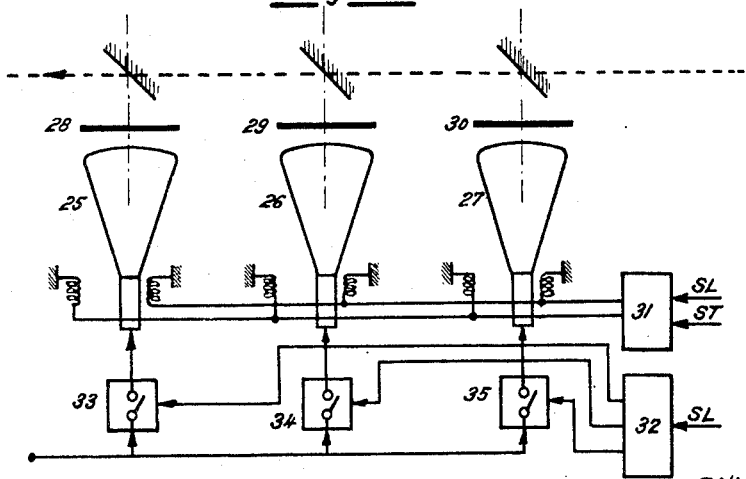
INVENTORS
Henri G. M. De France
Andre L. A. Feyzeau
By Ralph B. Stewart
attorney

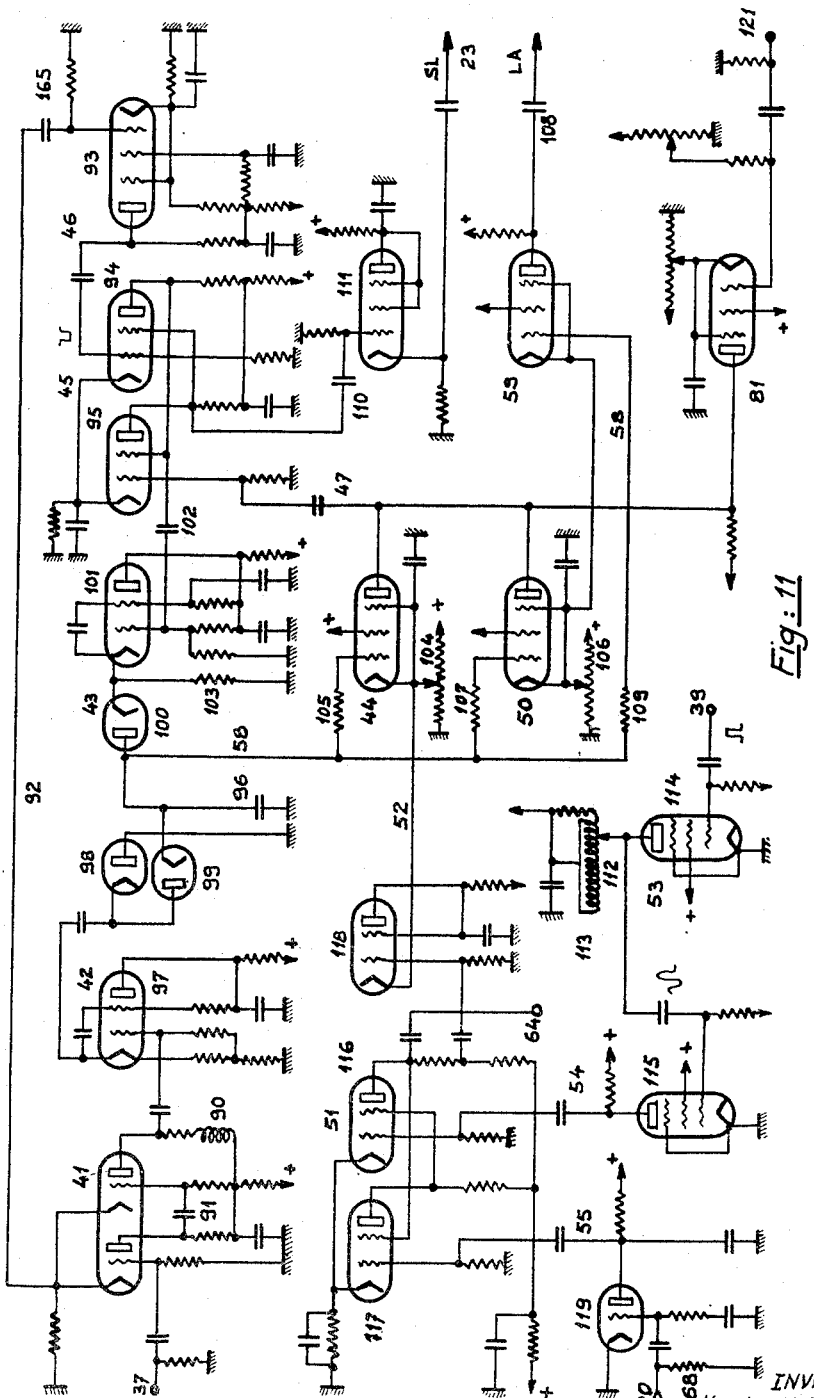

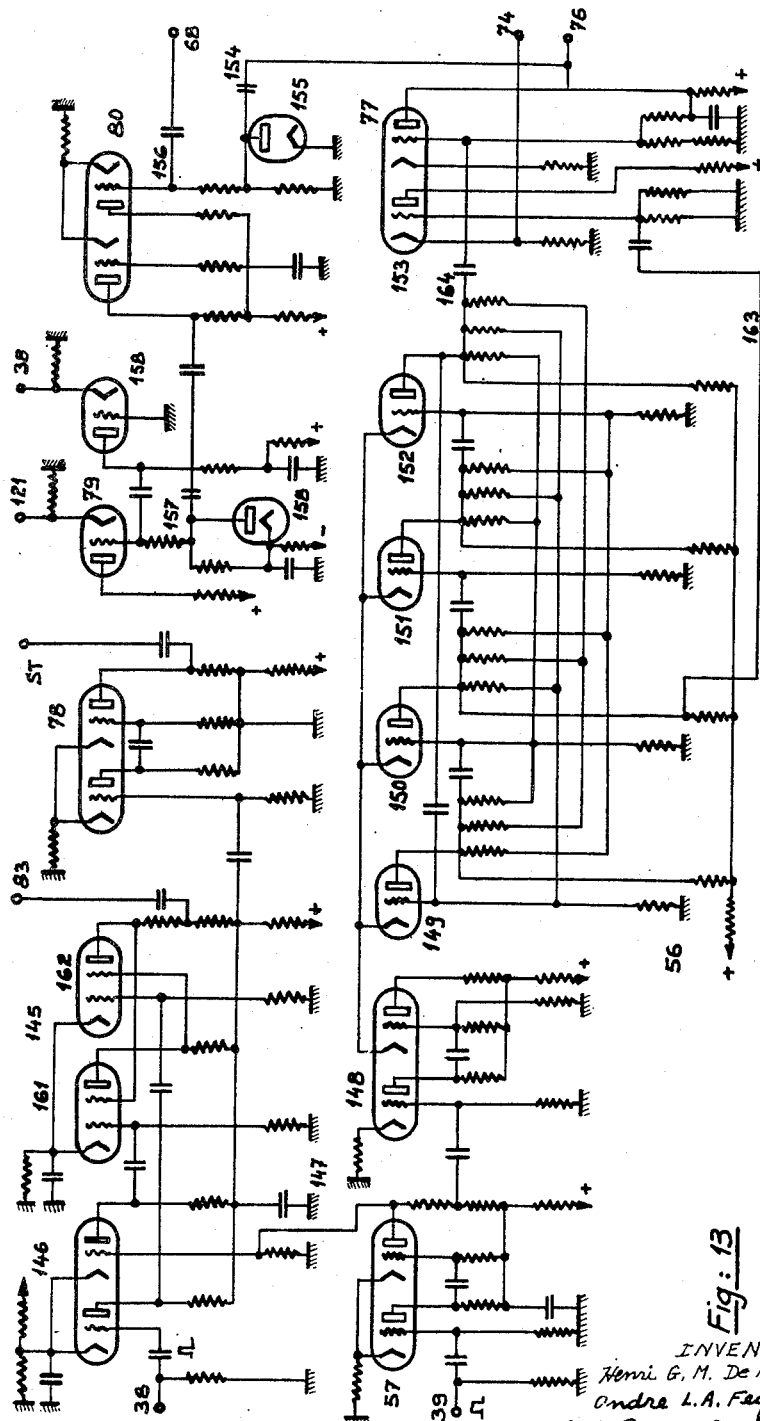

Patented Sept. 28, 1954

2,690,471

UNITED STATES PATENT OFFICE 2,690,471

COLOR TELEVISION SYSTEM

Henri Georges Marie De France, Paris, and André Louis Albert Feyzeau, Saint-Maur des Fosses, France, assignors to La Radio-Industrie S. A., Paris, France Application April 15, 1952, Serial No. 282,383

Claims priority, application France April 17, 1951

7 Claims. (Cl. 178—5.2)

The present invention relates to a color television system wherein the transmission of colored pictures is effected according to the well-known trichromatic analysis process and wherein the fundamental, or component, colors are interlaced at the frequency of the scanning lines both at the pick-up and reproducing ends.

An object of the invention is to provide such a system of the so-called "compatible" kind, viz. a system enabling the reception of a complete television signal from a color television transmitter by means of either a specially designed television receiver, for reconstituting a colored picture, or a conventional television receiver, for reconstituting a "black-and-white" picture, the reconstituted picture having in both cases the same number of lines per scanning frame.

Another object of the invention is to provide such a compatible system having recourse to an interlacing of four elementary or component picture scanning frames, recurring in a fixed order of alternation such as to ensure protection against improper appearance of the lines in the reconstituted pictures.

Another object of the invention is to provide such a four interlaced frame compatible system not requiring any auxiliary signal in the complete television signal for determining, at any receiver, the changes in color of the lines within a component frame and from one component frame to the next following one.

A further object of the invention is to provide a scanning process and signal generator for a four interlaced frame television system ensuring the transmission of colored pictures by a color interlacing at the scanning line frequency.

Such a color television system will be described with reference to the attached drawings, wherein:

Fig. 1 shows a typical illustrative design of a transmitter scanning arrangement in a color television system according to the invention;

Figs. 2 and 3 are graphs for the delineation of the sequential recurrence of the colored lines in the four consecutive component frames to be interlaced in such a television system;

Fig. 4 shows a diagram for broadly explaining the scanning operation of said interlaced frames in accordance with the invention;

Fig. 7 is a diagram indicating certain shapes of signals, to be used in the arrangement according to Fig. 6;

Fig. 10 shows a typical illustrative partial design of a receiver in a color television system according to the invention;

Figure 12:
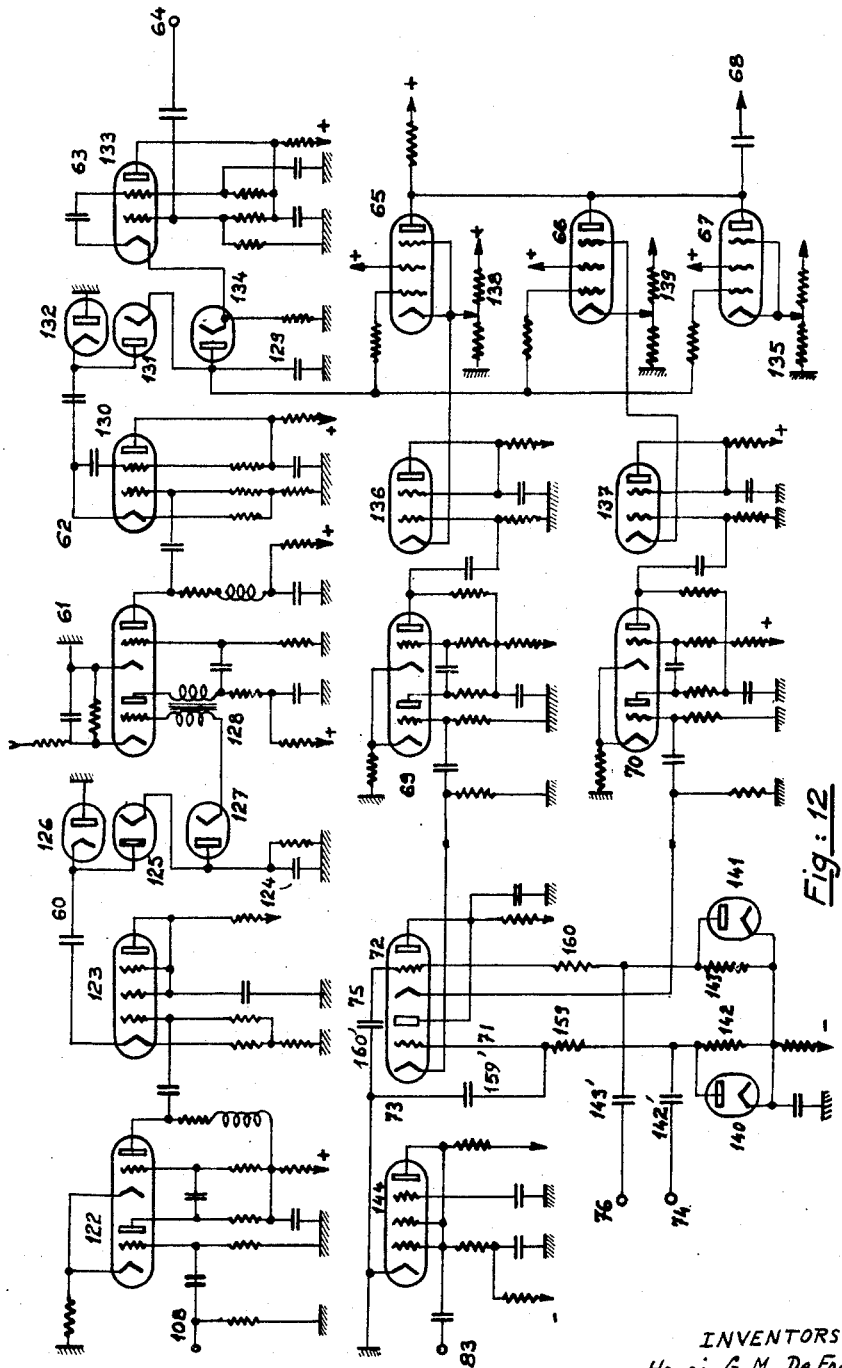

Figs. 11 to 13, inclusive, show together an illustrative detailed embodiment of a scanning signal generator included in the arrangement of Fig. 1, said embodiment more particularly referring to the block schematic diagram of Fig. 6.

A transmitter scanning arrangement in a color television system according to the present invention may comprise, as shown in Fig. 1, three analyser or camera tubes 1, 2, 3, each being for instance of the supericonoscope kind, and having color filters 4, 5, 6 so arranged as to solely receive on their scanned electrodes monochromatic pictures, for instance red in tube 1, blue in tube 2, green in tube 3. Said monochromatic pictures, if added together, will reproduce the complete colored picture projected onto said tubes through three distinct optical paths, for instance by means of silvered mirrors as 7, 8 and 9, or by means of any other known distributing optical system.

The so-called "mosaic" electrodes in the tubes 1, 2, 3, are scanned in synchronism by common deflecting voltages or currents derived from parallel branches at respective outputs 10 and 11 of a scanning signal generator 12, itself driven from a time base circuit 13. It is assumed that the output 10 is the line deflection output and output 11, the frame deflection output.

Three video signals are then concurrently formed in said tubes and are separately directed to respective inputs of three gates 14, 15 and 16, for instance to control grids of said gating tubes the respective outputs, for instance the plate outputs, of which are connected to separate video amplifying channels 17, 18 and 19. Each of the gate tubes has a second input, for instance a suppressor grid input, which receives a gating control voltage from a respective output of the scanning signal generator 12: gate 14 is controlled from the scanning output 20, gate 15 from the output 21, gate 16 from the output 22. Said control voltages are cyclically and sequentially interlaced in their respective applications on said gates, at a line synchronisation frequency from the signal generator 12.

The line synchronisation pulses from said signal generator 12 are derived at 23 and the frame synchronisation pulses are derived at 24. Both these synchronisation pulses will be further mixed, as usual, to the complete video signal itself constituted by the mixing together of the three sequentially derived video component signals from the gates 14, 15 and 16.

The invention is mainly concerned with a new and improved process and means for forming such line synchronisation pulses and deriving therefrom said gate control voltages. Fig. 2 shows the appearance of a four component interlaced raster required for practicing the invention. The scanning lines which exist in any of the four component frames I to IV are indicated in full lines and said interlaced raster is of the kind in which said component frames are distributed in the sequence I—III—II—IV. An observer at the reproducing end will see, first a line of the component frame I, for instance a red line R, then a line of the compenent frame III, for instance a blue line B spaced below the red lines of frame I, then a line in the component frame II, for instance a green line V appears between the two first lines (red and blue), and then underneath said three lines will appear a line of the fourth component frame IV, for instance a red line R, and so forth; the upward shift of the lines in the component frame II above the lines of the component frame III serving to decrease, as well known, the defiling appearance of the lines in a complete picture.

In each of said component frames, a red line R, a blue line B and a green line V cyclically appear and this results from the sequential operation of the three gates 14, 15 and 16 in Fig. 1. When passing from one component frame to the next following one, however, it will be useful to provide means for discriminating the color in which the first significant line in said next following frame is due to occur. Such a discrimination would necessitate the sending out, at the transmitter equipment, to the receiver, of characteristics synchronisation pulses in the line synchronisation signal, and thus would necessitate a specially designed line synchronisation circuit in each receiver. According to the invention, no such signal is provided and consequently no such special synchronisation circuit in each receiver, but for a reception of colored pictures, a mere electronic switch progressing by one step each time a line synchronisation pulse is received will suffice. Fig. 10 shows an illustrative partial arrangement of a receiver for this purpose: three reproducing or kinescope tubes 25, 26 and 27 are shown, having colored filters 28, 29 and 30 before their respective fluorescent screens, and said tubes receive the video signal on their respective light modulation electrode and have their scanning circuits synchronously controlled, the scanning voltages being derived in common from a conventional scanning generator 31; said conventional generator 31 is actuated by the received line and frame synchronisation pulses in the complete television signal after a conventionally operated separation from the video signal. These line synchronisation pulses are further applied to an electronic distributor 32 which sequentially and cyclically delivers unblocking voltages to three tube gates 33, 34 and 35 so that the light modulating electrodes of tubes 25, 26 and 27 are only controlled by the parts of the video signal which corresponds to the color of the filter associated with a particular tube. Such a picture reproducing arrangement is given by way of illustration and it is apparent that the only change in a conventional receiver lies in the addition of three gates and of an electronic distributor (line pulse counter) for the control of said gates.

Considering for instance a red line R as the first significant line in any component frame, wherein said R lines are distinguished from the other color lines in any of the four component frames I to IV in Fig. 3, it is apparent that a shift or displacement interval $a$ exists between the first significant R line in the component frame I and the first significant R line in the component frame II. Said shift interval $a$ is equal to one line and a half. Such a shift can be compensated both ways, either by a phase lag to be introduced in the component frame I or by a phase lead to be introduced in the component frame II. According to the invention, it is provided to introduce a compensating shift between said component frames so that each frame always begins with a significant line of the same component color and it is further provided to ensure such a relative phase shift, either lag or lead, during the frame fly-back period of the scanning raster, when the video signal is conventionally suppressed for passing from one component frame to the next following one. Likewise, for passing from the frame component II to the component frame III, a compensating phase shift of $b$, equal to three quarters of a line interval, is to be provided; for passing from the component frame III to the component frame IV, such a compensating shift is due to be equal to one line and a half, as indicated at $c$; for passing from the component frame IV to the component frame I, said shift interval is due to be equal to the time interval of two and a quarter lines, as indicated at $d$.

Now, for embodying such compensating relative shifts, the invention provides for a lengthening, or a shortening, of a number of scanning line intervals by a definite time interval, for instance by an eighth of a line interval, during said frame fly-back period of the scanning raster. Fig. 4 gives a brief view of the signals to be used for this end:—N indicates the frame fly-back (or frame blanking) signal, upon which is shown at T the frame change-over controlling pulse; SL indicates a series of regularly spaced line synchronisation pulses from a time base circuit; D shows an auxiliary series of pulses, which will also be supplied from the time base circuit, said series of pulses ensuring a division by eight of the time interval between two consecutive SL pulses. The span of the time interval $a$ of relative shift between the component frames I and II covers twelve lines in the component frame I from the frame change-over signal T, and said twelve line intervals must be lengthened, or shortened, each by an eighth of a line interval, which will ensure an overall compensating shift of a line and a half between the lines of the two component frames I and II which will then begin by significant lines of the same component color. The change from the component frame II to the component frame III will similarly be effected with a lengthening, or a shortening, of six lines in the component frame II, after the change-over signal T, hence producing an overall compensating shift of three quarters of a line interval between said frames. The change from the component frame III to the component frame IV will also be effected by lengthening, or shortening, by an eighth of a line interval, twelve lines in the component frame III after the change-over signal T, hence a relative compensating shift of one line and a half. Finally the change from the component frame IV to the component frame I requires the lengthening, or shortening, by an eighth of a line interval, of eighteen lines in the component frame IV after the change-over signal T, hence a relative shift of two and a quarter lines between said frames.

Naturally a sub-multiple of a line interval other than an eighth can be chosen for such a compensating operation, without any change in the process proper but varying the number of lengthened or shortened lines after the change-over signal T, in accordance with the number of D pulses which divide a time interval between two consecutive SL pulses.

Figure 5:
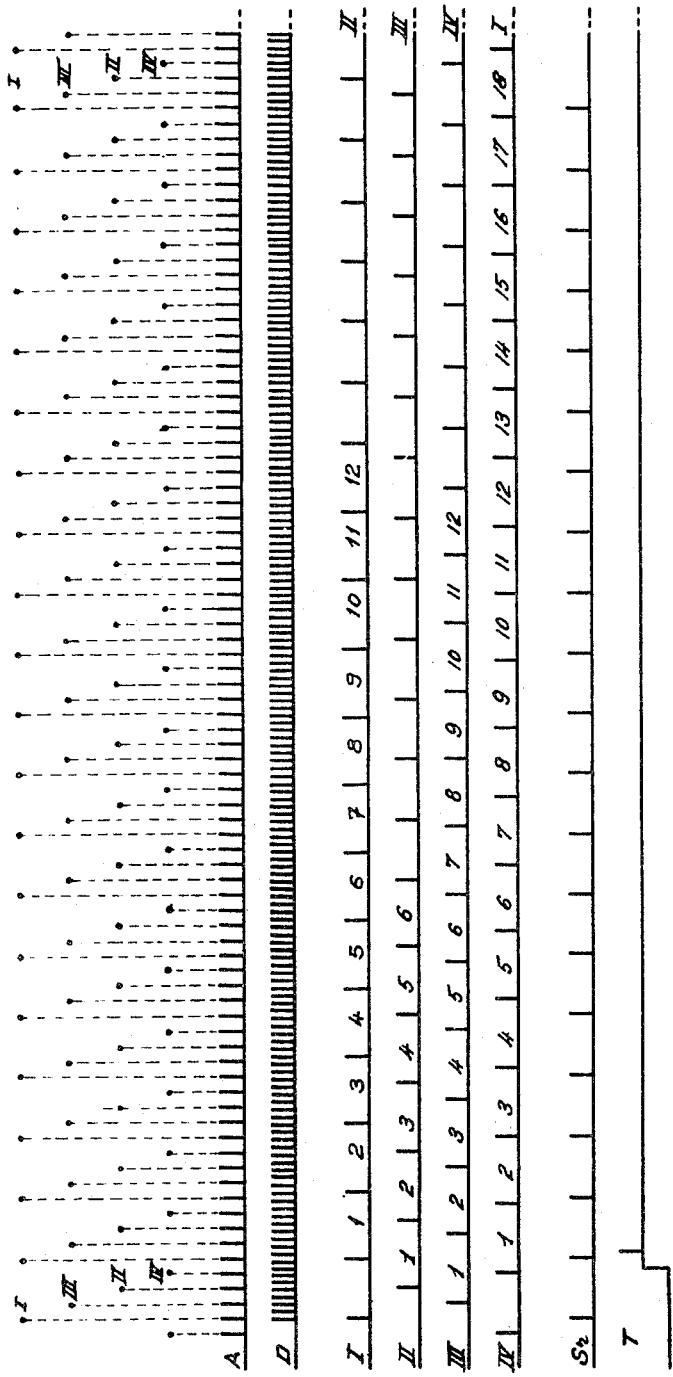
Figs. 5 and 8 show respective diagrams for illustrating the appearance of the passages from one component frame to the following one, of the four component frames, in accordance with two alternative embodiments, block schematic representations of which are respectively given in Figs. 6 and 9.
Figure 8:
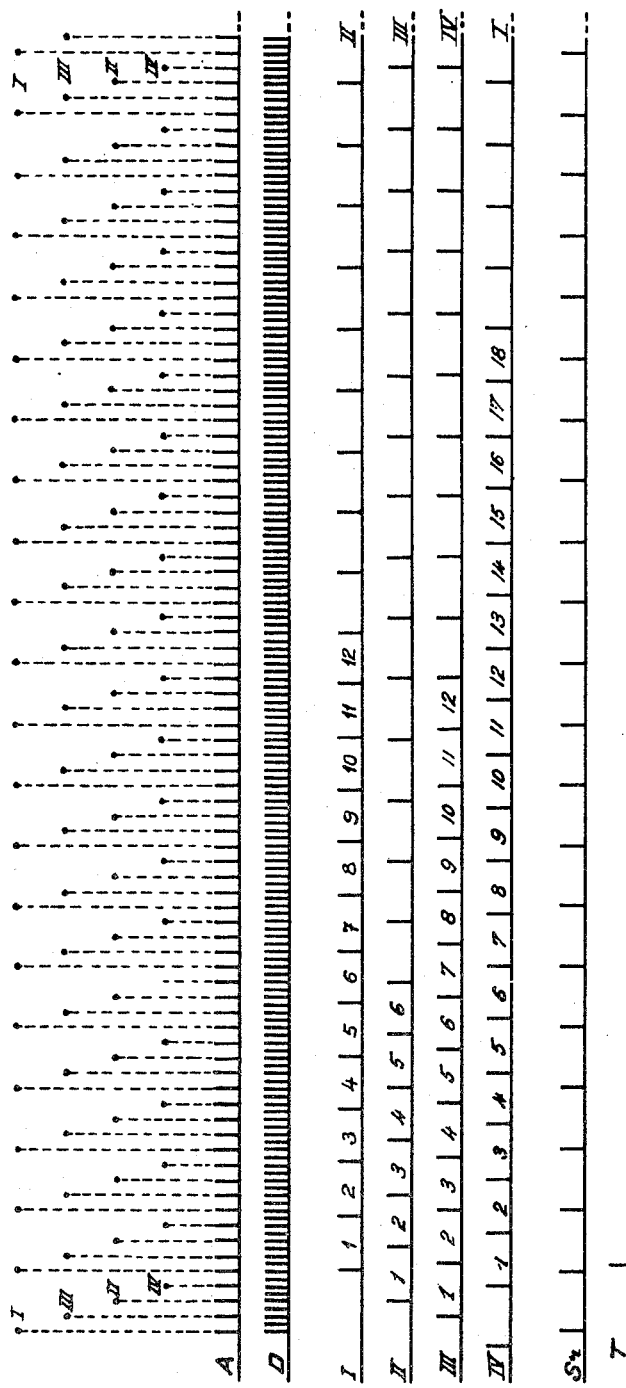

Fig. 5, in the case a line lengthening is adopted, and Fig. 8, in the reciprocal case of a shortening of lines, give more detailed diagrams than that of Fig. 4, disclosing the manner in which the method according to the invention may be put into practice. At the top of these Figs. 5 and 8 a graph plots the appearance of the interlacing on the reconstituted picture which is to be obtained; on the screen of the reproducer appear a line of the component frame I, a line of the component frame III, a line of the component frame II, a line of the component frame IV, and so on in a frame sequence in time.

At D is plotted the series of dividing pulses which, by the choice made of a time interval of an eighth of the time interval between normal line synchronisation pulses Sr, supplies a number of pulses double of the total number of line synchronisation pulses in a complete picture consisting of four interlaced component frames I, II, III, IV.

Along the graph I—II, is plotted the variations of relative time intervals between the line synchronisation pulses in the component frame I for the passage from the component frame I to the component frame II during the fly-back signal N from the change-over signal T. This change-over pulse is so provided as to occur between the line synchronisation pulse in the frame I which is in phase with the frame synchronisation signal N and the synchronisation pulse in the frame III which will follow said signal if the line were not lengthened in Fig. 5 (shortened in Fig. 8). For each frame change-over, the compensating phase-shift imparted may be visualized by comparing in the diagram the series of the recurrent line pulses Sr and the series of lengthened (Fig. 5), or shortened (Fig. 8), frame line pulses.

Referring first to Fig. 5, twelve line intervals, numbered from 1 to 12 are lengthened by an eighth of a line interval after the change-over signal T. The blanking signal N may be supposed to last about thirty-eight normal line intervals, by way of illustration. Said twelve lengthened line intervals provided for passing from the component frame I to the component frame II, according to the graph I—II, and also for passing from the component frame III to the component frame IV, according to the graph III—IV. Six line intervals, numbered from 1 to 6, are lengthened by an eighth of a line interval for passing from the component frame II to the component frame III, according to the graph II—III, and similarly, eighteen line intervals, numbered from 1 to 18 are lengthened by an eighth of a line interval for passing from the frame IV to the frame I, according to the graph IV—I.

Related to the operative diagram in Fig. 5, Fig. 6 shows a block schematic diagram of a scanning signal generator which provides for such a lengthening of numbered line intervals within the blanking period from one component frame to the next succeeding one.

A detailed circuit diagram for such a block arrangement will be further described in relation with Figs. 11 to 13, although any component circuit in Fig. 6 can be considered as conventional and thus of known constitution.

A numerical example will be given for better defining the invention as applied to a practical embodiment:—the signals will be derived from a time base circuit delivering three recurrent series of pulses, issuing from the pulse generators 37, 38, 39 (synchronised conventional multivibrators). The pulse generator 37 delivers an uninterrupted series of recurrent pulses at the frequency of 151,200 per second ($50 \times 3024$); the pulse generator 38 delivers an uninterrupted series of recurrent pulses at a frequency of 18,900 per second (151,200:8); the pulse generator 39 delivers an uninterrupted series of recurrent pulses at the frequency of 50 per second. These three series of pulses present a definite relative phase.

The component frame frequency of the concerned television system is then of 50 C. P. S. The picture (four frames) frequency is thus of 12,5 C. P. S. The normal line frequency is of 18,900 C. P. S. and, for instance, each frame comprises 378 lines, hence 128 lines of the same color in such a component frame. As said above, 38 line intervals may be reserved at the end of any component frame for defining the blanking frame period, viz. the time interval alloted to the frame substitution operation.

The line synchronisation pulses SL issuing at 23 in Figs. 1 and 6 are, during the inter-blanking periods derived from the D pulses of 151,200 C. P. S. issuing from the generator 37 by means of a cyclical count of groups of eight consecutive pulses from source 37. For this end, the pulses from 37 are applied to a shaping circuit 41 and then, when reshaped, on a circuit 42 comprising means applying a stepped charge to a condenser. The output of said circuit 42 is controlled by a condenser discharge circuit 43 which, each time it is actuated, clears the charge on the condenser in circuit 42 which gives an output signal to a threshold stage 44 so adjusted as to control the discharge by becoming conductive when the condenser charge has reached the value corresponding to that produced by eight incoming D pulses from 37.

This control of discharge is operated as follows: the discharge circuit 43 is normally set non-conductive, or "off," by an output of a bistable trigger stage 45; said trigger stage 45 receives on one of its separate actuation inputs the pulses from 37. By a bistable trigger stage is here intended a two tube circuit which presents two stable conditions, one defined by the conductiveness of the valve receiving the input signal at 46 (rest condition) and the other (work condition) defined by the conductiveness of its other valve receiving the signal from the actuation input 47. Such a circuit is brought to work by an input pulse at 46 and is reset to rest by the application of an input pulse at 47; when actuated to work, a pulse at 46 has no action on the condition of the circuit.

The actuation input 47 of said trigger stage 45 is connected to the output of the threshold stage 44, so that the trigger stage is brought to work by a pulse from 37, renders non-conductive the discharge circuit 43 during the seven following pulses from 37, by which eight pulses are applied to the condenser in the circuit 42 before the threshold stage 44 operates and, delivering an output signal resets the trigger circuit which renders conductive the discharge circuit 43 which clears the condenser in the circuit 42.

Each line synchronisation pulse SL is derived from the output 23 of the trigger stage 45 and is also applied, as shown, to the actuation input of a three condition step-by-step counter 49, which progresses by one step each time a pulse SL issues; said counter is connected in a closed loop. Separate outputs are provided for its three stages, 20, 21, and 22, which are thus cyclically operative for unblocking the gates 14, 15 and 16, Fig. 1, in the signal channels for the Red, Blue and Green video signal elements.

For the lengthening of a number of line intervals by an eighth of a line interval, the eight pulse level threshold stage 44 must be blocked and another threshold stage 50 be substituted in the control of the bistable trigger stage 45. Said threshold stage 50 is adjusted for becoming operative when the voltage charge of the condenser in circuit 42 has reached the value corresponding to the reception of nine incoming D pulses from 41. The output of the threshold stage 50 is connected to the triggering input 47 of the trigger stage 45, in parallel to the output of the threshold stage 44.

The control of operation of the threshold stage 44 is effected by another bistable trigger stage 51, the output connection 52 of which is connected to gating control electrode of said stage 44. When the stage 51 is in its rest condition, its higher valve being "on" as indicated by its hatched condition in the drawing, the threshold stage 44 is operative or unblocked. Each time a change-over pulse T is delivered by the generator 39, this pulse, after being retarded in phase at 53, is applied to the triggering input 54 of the stage 51 which comes to work and the threshold stage 44 is blocked or made unoperative. The restoration in its operative condition of the threshold stage 44 can be only made by a new triggering of the bistable stage 51, resetting it to its rest condition. This resetting must be made, through the triggering input 55, at an instant related to the required number of lengthened line intervals in the change-over from one component frame to the succeeding one, hence to the order of the concerned component frames.

The control of such a resetting is ensured through the combination of two counters: the first one cyclically counts the frame change-over control pulses T, from the generator 39. It is shown at 56 and comprises four stages, progressing in a step-by-step fashion, and is triggered through an actuation input 57. The second counter counts the number of lengthened lines, and is predetermined according to the condition of the first so that, after the frame change-over signal for passing from the frame I to the frame II, said second counter delivers an output signal once a count of twelve lengthened lines has been made; after the change-over signal for passing from the frame II to the frame III, it delivers its output signal once it has counted six lengthened lines; after the change-over signal for passing from the frame III to the frame IV, once it has counted twelve lengthened lines again; and after the change-over signal for passing from the frame IV to the frame I, once eighteen lengthened lines have been counted. The output signal from said lengthened line counter is connected to the triggering reset input of the control trigger stage 51.

In the disclosed embodiment, however, advantage is taken of the fact that the numbers of lengthened lines to be counted, six, twelve, eighteen, are all interger multiples of three, so that the counter arrangement is simplified by a prior demultiplication or division by three of the number of pulses indicating the lengthened lines. For this, in the connection 58 which directs the output of the stage 42 to the actuation input of said second counter of lengthened lines, after a lengthened line pulse selector 59, there is inserted a circuit 60 which provides such a division by three of the selected pulses of lengthened lines. The output of said circuit 60 passes through a reshaping stage 61 and is then applied to a circuit 62 wherein a condenser charge occurs by voltage steps. The output of said circuit 62 passes through a condenser discharge circuit 63. This discharge circuit is rendered unoperative by the frame change-over signal T from 39 and, for instance, from the trigger stage 51 at its output 52, from which is derived a branch connection 64. This connection 64 also serves to render the discharge circuit 63 operative when the trigger stage is brought back in its rest condition.

Three threshold stages are connected in parallel to the output of the condenser charging circuit 62:- the threshold stage 65 is so adjusted as to operate at the charge level two; the threshold stage 66, at the charge level four; the threshold stage 67, at the charge level six. Considering the prior division at 60, these threshold stages will then be rendered operative when six, twelve and eighteen lengthened lines are formed and selected at 59. These threshold stages have a common output 68 fed back to the triggering input 55 of the control trigger stage 51.

Now, the cyclical selection of one of said threshold stages must be ensured for a definite change-over of component frames, and said selection is controlled from the counter 56 of change-over pulses.

The threshold stages 65 and 66 are respectively rendered unoperative, when necessary, by univibrators or monostable trigger stages 69 and 70. The length of the blocking signal from said univibrators is not critical and must only be higher than the length of the blanking signal. Those univibrators 69 and 70 are themselves controlled from pulse coïncidence circuits 71 and 72, viz. threshold stages having a threshold adjusted at a level two; the coincidence circuit 71 detects the coincidence between an actuation pulse incoming on the branch 73 and the actuated condition output voltage of the second stage of the counter 56, issuing at 74. The coincidence circuit 72 detects the coincidence between an actuation pulse incoming on the branch connection 75 and the actuated condition voltage from the fourth stage of the counter 56, derived at 76 and inverted at 77 by a polarity or phase inverter stage. The actuation pulses are derived from a coincidence circuit receiving the 50 C. P. C. synchronisation pulses and the 18,900 C. P. S. pulses from 38.

Fig. 7 shows certain voltage diagrams for explaining the operation of the counter of lengthened lines in Fig. 6. The counter 56 being on its fourth condition, the change-over pulse ending the frame component I produces its actuation and the first stage of said counter is conductive during the period wherein the change-over from frame I to frame II is to be effected. The variation in time of the output of the first stage of the counter 56 is shown at I—II in Fig. 7; for the passage from frame II to frame III, the change-over pulse T causes the progression by one step of the counter 56 and the second stage is then conductive, so that the variation in time of the output of said second stage is such as indicated at II—III; the variation in time of the voltage from the third stage of the counter 56 is similarly indicated at III—IV and that of the voltage from the fourth stage indicated at IV—I. However, at IV'—I' is shown the variation in time of the voltage issuing from the phase inverter stage 77.

The curves B and C, in said Fig. 7, show the changes in time of the voltages which are respectively applied to the threshold stages 71 and 72, the threshold levels of which are indicated at b and c on these curves. It is apparent that, for the change-overs I—II, III—IV and IV—I, the circuit 71 will transmit an actuation signal to the univibrator 69, thus producing a blocking of the discharge circuit 65 (threshold two), but said discharge circuit 65 will be unblocked for the passing from frame II to frame III, so that six lengthened lines only will be counted and the charge of two pulses in the circuit 62 will produce a resetting pulse for the trigger stage 51 by its input 55, thus unblocking the eight level discharge circuit 44 on the one hand, and controlling the discharge circuit 63 on the other hand.

For the three other change-overs of frames, the circuit 65 will remain blocked, the trigger stage 51 cannot be reset but through one of the circuits 66 and 67, four and six level threshold, respectively, of the lengthened line counter.

From the curve C in Fig. 7, it is apparent that the threshold stage 72 is only conducting at the change-over from the frame IV to the frame I. Accordingly, the univibrator 70 will be actuated and the stage 66 will be blocked. The resetting of the trigger stage 51, hence the unblocking of the circuits 44 and 63, will only be operated through the circuit 67 after eighteen lengthened lines be counted. For passing from frames I to II and III to IV, on the other hand, the stage 66 is not blocked but only stage 65, and the resetting of the trigger stage 51 is operated after twelve lengthened lines be counted.

The frame synchronisation impulses for the television transmission are derived at ST from the pulses incoming at 39 and issuing from the coincidence circuit 83; said pulses are reshaped at 78 before being supplied to the scanning signal generator or other circuits.

It may be noted that the line synchronisation pulses SL must have a constant phase relation with respect to the frame synchronisation signal. To this end, an auxiliary arrangement is provided, for which use is made of the time base generator delivering the pulses of 18,900 C. P. S. The output signal from 38 is applied to a threshold stage 79 and the pulses of said frequency are only admitted through said stage 79 when passing from the component frame IV to the component frame I, as at this instant a univibrator 80 supplies a voltage pedestal of suitable value for these pulses in said threshold stage 79. The univibrator 80 receives on its input the resetting signal of the trigger stage 51, from the connection 68 from the counter of lengthened lines, and receives also the output signal from the inverter stage 77. The result, as indicated on the curve E in Fig. 7, on which the threshold value of the univibrator 80 is shown at e, is that the stage 79 transmits a certain number of the pulses of 18,900 C. P. S. during the time of a pedestal voltage f from the univibrator 80; said number of pulses is otherwise a quite arbitrary one. These transferred pulses, through an adjustable dephasing network 81, are applied to the input 47 of the trigger stage 45 for which they act as some kind of resetting pulses once the line frequency is again normal during the blanking period. By such means, the coincidence is ensured between the synchronisation signals in the component frame I and the pulses of 18,900 C. P. S. shown on the graphic Sr in Fig. 5.

Figure 9:
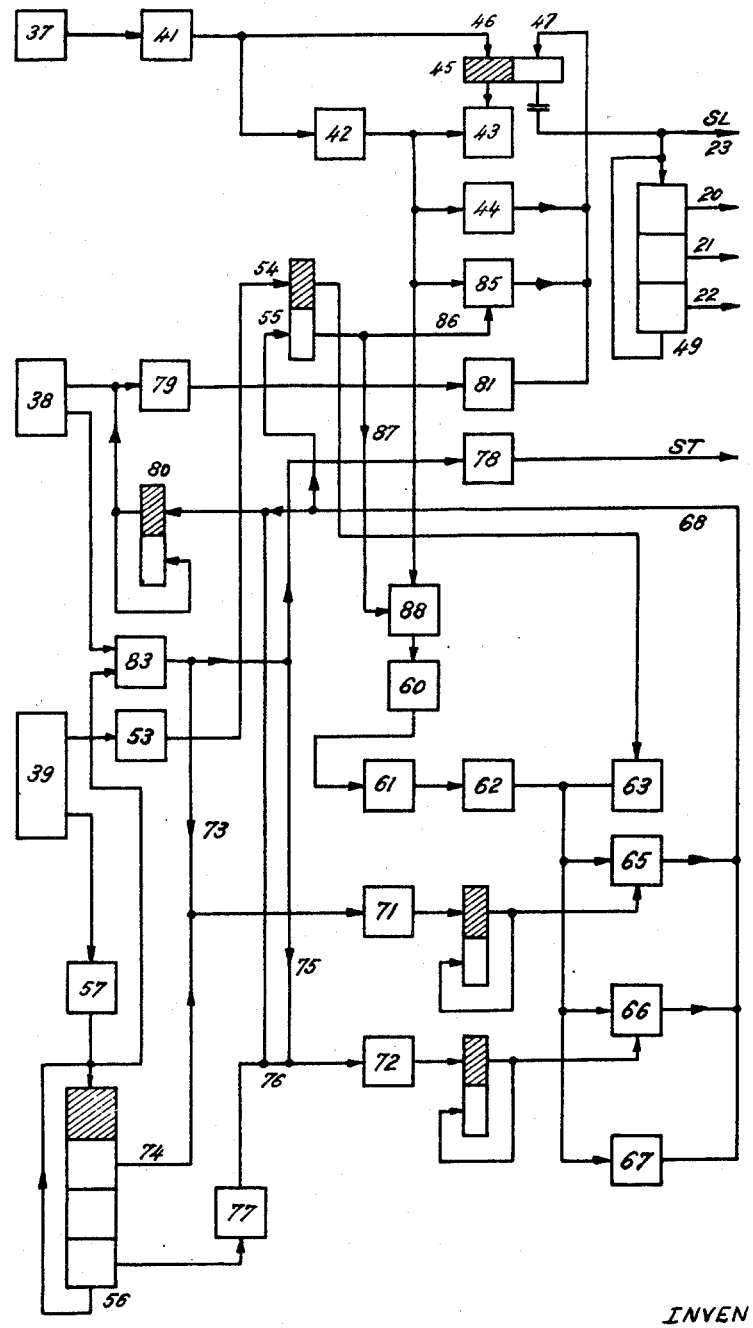

Considering now the case in which the line intervals are shortened instead of lengthened, viz. the graphs in Fig. 8 and the block schematic arrangement in Fig. 9, the threshold stage 50 in Fig. 6, of a nine pulse level threshold is replaced by a threshold stage 85, Fig. 9, having a seven pulse level threshold, said stage 85 being normally unoperative through a blocking connection 86 from the trigger stage 51. The pulse selector 59 of Fig. 6 which was designed for the selection of pulses corresponding to a nine pulse level in the circuit 42 is replaced by a pulse selector 88 in Fig. 9 which is designed for the selection of the pulses corresponding to the seven pulse level in the circuit 42, said pulse selector being unblocked through the lead 87 only during the time intervals wherein the circuit 80 is conductive. The remaining arrangements of the signal generator are unchanged.

Figs. 11 to 13 show, together, the component circuits of the arrangement in Fig. 6, by way of illustration. The counter 49 however is omitted in said Figs. 11 to 13, its constitution and operation being apparent from that shown and described for the counter 56, Fig. 13. The pulses from the time base will be supposed available in positive polarity on terminals 37, 38 and 39.

The terminal 37, Fig. 11, applies the pulses of 151,200 C. P. S. from the time base to the shaping circuit 41 which comprises a univibrator of conventional circuit: a double triode tube having a self-inductance 90 in the plate of its second triode element, a capacitive connection from the plate of the first triode element to the control grid of the second, the incoming signal being applied to the control grid of the first triode element.

The output lead 92 is brought out from the cathodes of said reshaping stage, across a differentiating network 165, for the application of the differentiated pulses from the rear front of the rectangular signal in said cathodes, to the control grid of an input control tube 93 of the trigger stage 45. Said bistable trigger stage 45 is also of a conventional circuit design, comprising for instance two screen-grid tubes 94 and 95, having reciprocal interconnections between their plates and screen-grids, and having separate inputs on their control grids. The input connection 46, from the plate of the tube 93 ensures the "off" operation of the tube which was normally "on" in the rest condition of the trigger stage. This change of condition occurs as the first pulse from 41 reaches the tube 93, and the following pulses from 41 will not have any action on the trigger stage as long as said stage will not have been reverted to its prior condition by the occurrence on the control grid of the tube 95, through the other actuation input 47, of a pulse controlling the discharge of the condenser 96 in the pulse counter.

Said counter of pulses of 151,200 C. P. S. has its operation based upon the charge and discharge of said condenser 96 included in the circuit 42 comprising also a tube 97 energised from the plate output of the second triode element of the reshaping circuit 41, and a pair of diodes 98—99 of reverse connections in the cathode output of the tube 97.

The negative alternations of the signal from 41 applied on the control grid of tube 97 are short-circuited to the ground through the diode 98 and the positive alternations, when said univibrator 41 resets, are applied to the condenser 96 through the diode 99 and charges said condenser. The armature of said condenser which is insulated from the ground is further connected to the plate of a diode 100 included in the discharge control circuit 43. The cathode of said diode 100 follows the cathode voltage of a tube 101 which has its own condition controlled from the condition of the tube 94 of the trigger stage 94—95, the control grid of the tube 101 being connected through a capacitive connection 102 to the plate of the tube 94. When said tube 94 is "on" and is brought "off" at the beginning of a count, the positive pulse does not act on the tube 101 which is "on," but when said tube 94 goes "on," at the end of the count, the tube 101 is momentarily driven "off" by the negative plate impulse from 94, a negative impulse is applied to the cathode of the diode 100 and said diode becomes conductive and ensures the complete discharge of the condenser 96 through the grounded resistor 103.

The discharge of the condenser 96 may be initiated from the operation of one of the stages 44 and 50, as previously explained. The gating stage 44, from the adjustment of its cathode bias at 104, becomes conductive in the absence of any blocking voltage at 52, when its control grid receives through a series resistor 105 from the connection 58 a potential across the condenser 96 which corresponds to the eighth step of the condenser charge (potential value acquired by said condenser at the eighth pulse received at 37). The gating stage 50, from the adjustment of its cathode bias at 106, becomes conductive when the voltage on its control grid received from the connection 58 through a series resistor 107 denotes that nine incoming pulses at 37 have charged the condenser 96; this is only possible when the stage 44 has been made unoperative.

Both transfer stages 44 and 50 have their plate outputs connected to the actuation input 47 of the valve 95 of the trigger stage 45.

From the lead 58 also, a tube 59 is energised for the derivation of the pulses corresponding to lengthened lines, said tube 59 having the same bias cathode voltage as the tube 50 and thus the same threshold of operation. At the output 108 of said tube 59 appear lengthened line pulses LA. The series resistor 109 is shown in the control grid connection of said tube 59. A polarity inverter (not shown) connects the output lead 108 of lengthened line pulses to the input of the lengthened line counting arrangement, 108 in Fig. 12.

The line synchronisation pulses are derived from the plate of the tube 95 of the trigger stage 45 through a capacitive coupling 110 to the control grid of a transfer stage 111 which, by its cathode output, ensures the sending of the line synchronisation pulses SL to the conductor 23.

Considering for instance the tube 44 "on" after the eight incoming pulses from 37, said tube delivers an output signal which actuates the trigger stage 45 by putting "off" its tube 95 which was "on." The trigger stage 45 resets to rest and clear the charge on the condenser 96.

When said tube 44 is rendered unoperative from the connection 52, said trigger stage actuation is controlled by the tube 50. For rendering inoperative the tube 44, the frame change-over pulses T of 50 C. P. S. from the time base are applied at 39 and the circuit 53 reshapes these pulses and delays them, for instance through a delay line 112, short-circuited at its end 113, inserted between the input tube 114 and the output tube 115 of said reshaping circuit. By its plate connection 54, the tube 115 drives the trigger stage 51. Each time a frame change-over pulse T is applied at 39, the trigger stage 51 is actuated and its tube 116 delivers a positive pulse which, through the cathode follower stage 118 reaches the connection 52. The stage 44 is thus made unoperative and remains in this state as long as the tube 116 remains nonconductive. The trigger stage 51 is reset to its rest condition and thus unblocks the stage 44, through a connection 55 to the control grid of its tube 117, from a transfer tube 119 which receives the control pulses on its control grid from the terminal 120.

These control pulses are derived from a counter of lengthened lines which is shown in Fig. 12. The discharge control signal for said counter will however be taken from an output of the trigger stage 51, Fig. 1, in accordance with the diagram of Fig. 6.

Further, in Fig. 11, the input circuit 47 of the trigger stage 45 is also connected to the output of a tube 81 which receives from the terminal 121 a periodic signal for phase resetting. The derivation of such a signal will be described in relation to Fig. 13.

Referring to Fig. 12, the lengthened line pulses LA are applied by an input terminal 108 to a reshaping stage 122 consisting of a univibrator similar to 41. The output signal from said reshaping circuit 122 is applied to a circuit which ensures a division by three of said pulses LA. Such a circuit is of the kind of a stepped charge counter just described in Fig. 11. It comprises an input tube 123 which, by its cathode output, charges a condenser 124 through a diode 125, a second diode 126 cancelling the signals of reverse unwanted polarity, as explained above. When the condenser 124 has acquired the charge corresponding to three incoming pulses LA, it is discharged and cleared through a diode 127 the cathode of which is connected to the input of a reshaper stage 61. This reshaper stage may comprise a double triode tube, the left hand element of which has its control grid and plate coupled through a reaction transformer 128, thus constituting a blocking oscillator, the cathode of which is driven to a positive potential on a voltage divider between battery and ground. When the charge on the condenser comes higher than the cut-off potential of the tube, the plate current is established and the coupling due to the transformer 128 is such that the control grid is driven positive, and a cumulative action occurs; the condenser 124 discharges through the diode 127 and the grid-to-cathode space of the oscillator.

Further the diode 127 avoids the partial recharging of the condenser 124 at the reversal of current in the transformer 128. The value of the resistor put in parallel to the diode is such that the time constant defined by the shown resistance-capacitance network is high with respect to a voltage step, but the condenser 124 can be completely discharged within 1/50° of a second. This is useful at the instant of beginning of the operation so that upon arrival of the first useful pulse the insulated armature of the condenser 124 will be at zero potential.

The plate current is in the first triode element of the tube 61 during the discharge of the condenser 124 built across the plate load a negative pulse voltage which is peak-limited by the cut-off action of the second triode element of the tube, and thus said amplified impulse is delivered with an accurate calibration by the plate output of the second triode element of the tube 61.

The output pulses, one pulse issuing for each group of three incoming pulses, are then applied on a lengthened line pulse counter, again of similar construction including input tube 130, diodes 131 and 132, condenser 129, the discharge circuit for said condenser 129 comprising again an input tube 133 and a diode 134. By its input terminal 64, said discharge circuit receives the output plate signal from the trigger stage 51, from the plate of the tube 116 in Fig. 11. The actuating pulses for said trigger stage, for the operation of 63, are supplied from the output 68 in Fig. 12, fed back to the terminal 120 in Fig. 11. Their instants of occurrence are thus conditioned by the conductibility setting of the circuits 65 to 67 of the lengthened pulse counter in Fig. 12, one of said three circuits alone, viz. 67, being permanently operative and being adjusted by its cathode potential at 135 for delivering an output voltage each time the voltage across the condenser 129 becomes higher than (or reaches the level of) six incoming pulses on the tube 130, said six incoming pulses corresponding to eighteen lengthened pulses appearing at 108.

The circuits 65 and 66 are placed under the control of respective univibrators 69 and 70, and said univibrators are themselves placed under the control of output signals from respective threshold stages 71 and 72.

Both tubes 71 and 72, triode elements of a double triode, are normally "on" in the absence of control voltages on their respective input terminals 74 and 76. This condition is met by the provision of two diodes 140 and 141 shunting parts of their biassing resistors, said diodes being in a conductive state.

In such a general condition, with no voltage across the terminals 74 and 76, a control pulse for the univibrators 69 and 70 would pass through both stages 71 and 72, for a change-over of component frames, and the lengthened line counter would always count eighteen lengthened pulses before delivering its output signal, since the tubes 65 and 66 would be unoperative for each change-over of frames.

These control pulses are derived from a terminal 83 of the circuits shown in Fig. 13 and, by the terminal 83 in Fig. 12, they are applied to a transfer stage 144, mounted as a cathode follower stage, from which cathode output said pulses are differentiated into the networks 159—159' and 160—160', respectively inserted in the control grid inputs of the triode elements 71 and 72.

In Fig. 13, the output terminal 83 is taken from a plate of a bistable trigger stage 145, comprising two tubes 161 and 162, conventionally connected by reciprocal plate-to-grid networks. The inputs of said trigger stage are separate, the actuation input of the tube 162 receiving the pulses of 18,900 C. P. S. at the terminal 38 through a triode element of a double triode transfer stage 146, the other actuation input, for the tube 161, receiving the change-over pulses T of 50 C. P. S. as applied from the terminal 39 to a transfer stage 57, one plate output of which, 147, contains a differentiating network for the triggering actuation of the stage 145, through a triode element of the tube 146.

By this circuit arrangement, the trigger stage 145 is maintained in its rest condition during the time intervals between the 50 C. P. S. pulses by means of the 18,900 C. P. S. for delivering a voltage pulse at 83, the length of which is a measure of the time interval between an actuation pulse of 50 C. P. S. and the next following pulse at 18,900 C. P. S. This ensures a definite phasing of the control pulses of the two univibrators 69 and 70, Fig. 12.

The actuation of said univibrators is further placed under the control of the condition of the counter 56, Fig. 13, which counts in a cyclical and sequential way the component frame change-over pulses T from the time base generator 39. Said counter comprises a four-stable position trigger circuit, consisting of a step-by-step counter having its four tubes 149 to 152 interconnected according to a well-known ring chain. The counter 56 is driven by the cathodes from the change-over pulses T of 50 C. P. S. which are phase-displaced in the transfer stage 57, and further phase shifted in an additional stage 148 by differentiation in the input circuit of the first triode element of said stage 148. The actuation pulses for the counter 56 are then obtained from a cathode output of the second triode element of said stage 148.

In the counter 56, a tube only can be conductive, the rank of said tube increasing by one step each time a component frame pulse T is received; said counter operates in a cyclical progress of four conditions of stability.

The output 163 of the tube 150 of the counter is connected to the control grid of a triode element 153 having a cathode load across which is taken the output terminal 74. The plate output 164 of the tube 152 of the counter 56 is connected to the control grid of a polarity inverter triode element 77, the plate output of which is connected to the terminal 76.

The terminals 74 and 76 in Fig. 13 are connected to the corresponding terminals 74 and 76 in Fig. 12. The connection 163 is provided with a high time constant in order to transmit the signal II—III of Fig. 7 to which will be super-impressed the pulses incoming from the differentiating connection 159—159' in Fig. 12 for controlling the univibrator 69. The connection 164 is similarly provided with a high time constant.

At the change-over pulse T between the frames I and II, the tube 152 which was "on" is put "off," the tube 149 becoming conductive. The tube 152 delivers a positive pulse which appears as a negative pulse, by the polarity reversal at 77, on the terminal 76. Said negative pulse blocks the diode 141 which was conductive and, from this action, the stage 72 is led to a too low control grid bias so that the actuation pulse for the univibrator 70 cannot pass. The tube 66 of the counter of lengthened lines is then unblocked at this frame change-over instant and delivers an output voltage when the charge of the condenser 129 reaches a value corresponding to four incoming pulses. The counter of lengthened pulses thus delivers its output signal when twelve lengthened pulses have been delivered before controlling the return to a normal line interval by its output 68 fed back to the actuation input of the trigger stage 51, Fig. 11. The tube 65 of the counter in Fig. 12 has been blocked through the operation of the univibrator 69 controlled by the pulse which has been transmitted through the tube 71.

The time constant provided by the resistance-capacitance network 143—143' ensures the blocked condition of the diode 141 during the complete time interval required for the count, at 56, of three frame change-over pulses—see curve C, Fig. 7. The tube 72 will be rendered conductive only at the time of change-over of the frame IV to the frame I, and will be blocked again for the passage from the frame I to the frame II.

For passing from the component frame II to the component frame III, the pulse T actuates the counter 56 which progresses by one step. The tube 149 becomes "off" and the tube 150 "on." A negative pulse is delivered on the connection 163. This negative pulse is transferred through the tube 153 to the terminal 74. The diode 140 is then blocked until the pulse T for the component frame III arrives, as indicated in the curve B, Fig. 7. Both tubes 71 and 72 being blocked, neither the univibrator 69 nor the univibrator 70 operates, neither the stage 65 nor the stage 66 is blocked, and the stage 65 will then deliver an output pulse after two pulses have reached the condenser 129. The counter of lengthened lines will thus be reset after six lengthened pulses have been counted, and the signal on the connection 68 re-establish a normal time interval for the following synchronisation pulses.

For passing from the component frame III to the component frame IV, the condition of the tubes 71 and 72 is restored similar to the one relating to the passage from the frame I to the frame II. The stage 66 will be conductive and deliver a pulse after twelve lengthened lines are counted. In the frame counter 56, the incoming actuating pulse produces advance by one step of the ring chain, so that the tube 151 is conducting and the other tubes non-conducting. The positive pulse issuing from the tube 150 renders conductive the diode 140, curve B, Fig. 7.

Finally, at the fourth change-over pulse T, the counter 56 progresses again by one step and the tube 152 goes "on," thus delivering a negative pulse which, in reversed polarity from 77, renders the diode 141 conductive. Both the stages 71 and 72 are both conductive, both the univibrators 69 and 70 are actuated, both stages 65 and 66 are blocked and the stage 67 thus delivers the output pulse of the counter of lengthened lines, after eighteen lengthened lines have been produced.

A phase resetting of the normal synchronisation lines after the lengthened ones is provided and is ensured by applying a reset control pulse to the trigger stage 45, Fig. 11, from a transfer stage 81. Said particular reset pulse is applied each fourth pulse T and is derived as follows, Fig. 13, from the output terminal 76 of the frame pulse counter 56: from said terminal 76, a branch conductor 154 renders the diode 155 conductive each time a pulse is delivered at 76 from the counter 56; when said diode 155 is conductive, the impulse from 68 is applied at 156 to the control grid of the tube 80. The univibrator tube 80 is thus actuated to its work condition and its output 157 renders conductive a diode 158 which makes part of the biassing network of the threshold stage 79 so that said stage 79 is then rendered conductive for the transmission of a certain number of the pulses of 18,900 C. P. S. which are applied to its control grid through a buffer stage 158. The time interval during which said pulses thus pass towards the trigger stage 45 is adjusted by the time constant of the univibrator 80—see curve E, Fig. 7.

The frame synchronisation signals for the television system are picked up from the output ST, Fig. 6, and are created by means of a univibrator 78 from the pulses issuing from the trigger stage 145, Fig. 13.

Certain details of the described embodiments may be changed without departing from the scope of the invention, more particularly with a view of simplification of the circuits: the frame change-over pulse counter 56 may control the stages 65 and 66 by its output terminals 76 and 74, the threshold stages 71 and 72 and the univibrators 69 and 70 may be then omitted, as well as the branches 73 and 75 from the stage 83—these omissions only alter the degree of safety of the device. Also the bistable trigger stage 45 may be replaced by a monostable or univibrator trigger stage, comprising only the actuation input 47, the actuation input 46 and the annexed circuits being then omitted.

Naturally the counters shown and described as comprising a condenser the stepped charge of which determines the count of incoming pulses may be replaced, if wanted, by impulse counters of the kind of the ring chain counters or of the binary cascade counters.

We claim:

1. In a line sequential color television system, the combination of means for scanning a coloured picture according to a plurality of interlaced component frames, means for scanning the lines in each component frame according to a predetermined sequence of fundamental colors, a time base generator of regularly timed pulses of a normal frame frequency, a time base generator of regularly timed pulses of a frequency equal to a multiple of that of the line synchronisation pulses, a variable-ratio counter for said pulses of a multiple line frequency including means for normally deriving from the output of said counter line synchronisation pulses of a normal line frequency, a cyclical counter for said pulses of normal frame frequency, and means for changing the counting ratio of said counter of multiple line frequency pulses under the control of the condition of said cyclical frame frequency pulse counter and for restoring the normal counting ratio of said multiple frequency pulse counter once a predetermined number of pulses has been derived by said counter at said changed counting ratio.

2. A combination according to claim 1 wherein means are provided in said predetermined counter of multiple line frequency pulses for increasing the count of said multiple frequency pulses between the derived line synchronisation output pulses during the periods in which its counting ratio is changed.

3. A combination according to claim 1 wherein means are provided in said predetermined counter of multiple line frequency pulses for decreasing the count of said multiple frequency pulses between the derived line synchronisation pulses during the periods in which its counting ratio is changed.

4. In a line sequential color television system, the combination of means for scanning a coloured picture according to a plurality of interlaced component frames, means for scanning the lines in each component frame according to a predetermined sequence of fundamental colors, a time base generator of a timed series of pulses of a normal frame frequency, a time base generator of a timed series of pulses of a frequency multiple to that of the normal line synchronisation frequency, a counter of said multiple frequency pulses and means for applying the output pulses from said counter of a submultiple frequency to the control of said means for scanning the lines in each component frame, a counter of said normal frame frequency pulses for the cyclical count of said pulses according to the number of said interlaced component frames and means for applying said normal frame frequency pulses to said means for scanning the picture according to said plurality of interlaced component frames, means for deriving from said frame frequency pulses a periodical signal changing the counting ratio of said counter of multiple line frequency pulses, means for selecting the output pulses from said counter at said changed counting ratio, a counter of said selected pulses, means for controlling and periodically varying the counting ratio of said counter of said selected pulses in accordance with the count of said cyclical frame frequency pulse counter, and means controlled by the output pulses from said counter of selected pulses to return said counter of multiple line frequency pulses to its normal counting ratio.

5. In a line sequential color television system the combination of means for scanning a coloured picture according to a plurality of interlaced component frames, means for scanning the lines in each component frame according to a predetermined sequence of fundamental colors and a time base generator of a timed series of pulses of a normal frame frequency, a time base generator of a timed series of pulses of a frequency equal to a multiple of that of the normal line synchronisation frequency, a counter for said multiple frequency pulses, means in said counter for deriving output pulses at a normal line synchronisation frequency and means for deriving output pulses at a frequency other than said normal line synchronisation frequency, a counter of said derived pulses of the one or the other of said frequencies, said counter cyclically controlling the said means for scanning the lines in each component frame according to a predetermined sequence of fundamental colors, a counter for cyclically counting said normal frame frequency pulses according to the number of said interlaced component frames and means for applying said normal frame frequency pulses to said means for scanning the picture according to said plurality of interlaced component frames, means for deriving from said normal frame frequency pulses a periodic signal switching in said counter of multiple line frequency pulses the output of said means for deriving the output of normal frequency pulses to the output of said means for deriving pulses at said other than normal line frequency for the actuation of said counter for the control of the said line scanning means in each component frame, means for selecting the output pulses from said counter of multiple line frequency pulses of said another line frequency, a counter of said selected pulses, means for controlling and periodically varying the counting ratio of said counter of selected pulses in accordance with the count of said cyclical frame frequency pulse counter and means for deriving from the output pulses from said counter of selected pulses a signal switching back in said counter of multiple line frequency pulses the output of said means for deriving the normal frequency line synchronisation pulses to the actuation input of said cyclical counter for the control of the said line scanning means in each component frame.

6. In a combination according to claim 5, the provision of a time base generator of normal line synchronisation frequency pulses and of means for controlling from said pulses the synchronism of the frame and line synchronisation pulses for the control of said scanning means.

7. A line sequential color television scanning signal generator comprising in combination, means for scanning a coloured picture according to four interlaced component frames and means for scanning the lines in each component frame according to a predetermined sequence of three fundamental colors, a time base generator of a timed series of pulses of a normal frame frequency, a time base generator of a timed series of pulses of a frequency equal to $n$ times the normal line frequency, a counter of said multiple line frequency pulses including means for generating a line synchronisation pulse each time it has counted $n$ incoming pulses and also means for supplying a line synchronisation pulse each time it has counted $n+1$ incoming pulses, a cyclical three conditions counter of said generated line synchronisation pulses, said cyclical counter controlling by three separate outputs the color characterisation of the consecutive lines in a component frame, a four stage counter for cyclically counting said normal frame frequency pulses, a bistable trigger stage controlling in its rest condition the application of said normal line synchronisation pulses from said demultiplying counter to said cyclical three condition counter and controlling in its work condition the application of said varied frequency pulses from said demultiplying counter to said cyclical three condition counter, means for actuating to its work condition said bistable trigger stage each time a normal frame frequency pulse is delivered by said time base generator of frame synchronisation pulses, a selector circuit of said varied frequency line synchronisation pulses and a counter of said selected pulses, said counter including means for supplying an output pulse for the resetting of said bistable trigger stage after a predetermined count of selected pulses, and also including means for delivering output pulses after twelve, eighteen and six selected pulses have been counted, output control connections from the second and fourth stages of said four stage cyclical frame frequency pulse counter for respectively unblocking the output circuits in said counter of selected pulses delivering said resetting pulses after six and twelve selected pulses have been counted, and a resetting connection from the output to the input of said counter of selected pulses through said bistable trigger stage.

References Cited in the file of this patent

UNITED STATES PATENTS

| Number | Name | Date |
|---|---|---|
| 2,296,908 | Crosby | Sept. 29, 1942 |
| 2,521,010 | Homrighous | Sept. 5, 1950 |
| 2,530,431 | Huffman | Nov. 21, 1950 |
| 2,552,464 | Seizen | May 8, 1951 |
| 2,558,489 | Kalfaian | June 26, 1951 |